United States Patent

[11] 3,571,570

| [72] | Inventor | Noel William Taulman |
| | | 3714 E. Virgin St., Tulsa, Okla. 74115 |
| [21] | Appl. No. | 834,464 |
| [22] | Filed | June 18, 1969 |
| [45] | Patented | Mar. 23, 1971 |

[54] THEFTPROOF CREDIT CARD APPARATUS
4 Claims, 7 Drawing Figs.

[52] U.S. Cl. ................................................. 235/61.7,
235/61.11, 101/45, 340/149
[51] Int. Cl. ................................................. G06k 7/10
[50] Field of Search ................................................. 235/61.7,
61.9, 61.11 (S), 61.7 (B); 101/45, 346 (Inquired),
101, 197 (Inquired); 340/149, 149 (A)

[56] References Cited
UNITED STATES PATENTS

| 2,438,588 | 3/1948 | Tolson | 235/61.11 |
| 2,482,242 | 9/1949 | Brustman | 235/61.11 |
| 3,132,241 | 5/1964 | Wolfheimer | 340/149 |
| 3,504,343 | 3/1970 | Ditlow | 340/149 |

*Primary Examiner*—Thomas A. Robinson
*Attorney*—Head & Johnson

ABSTRACT: In an apparatus for the recordation of credit sales to be used in conjunction with a card having a plurality of apertures therein, light rays passing through apertures in a housing member and apertures on the card, said apertures being in registered alignment, impinge upon a photosensitive receptacle which triggers an electrical circuit whereby a roller mechanism is allowed to be passed over said card thereby imprinting the desired information upon a credit ticket.

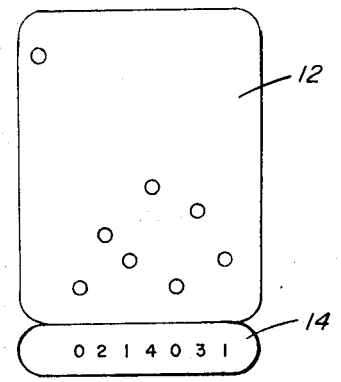
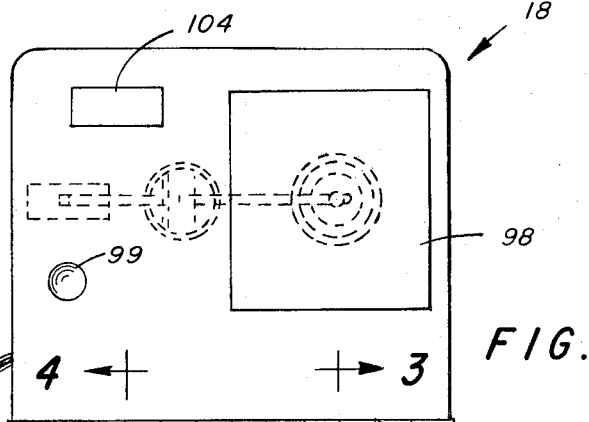
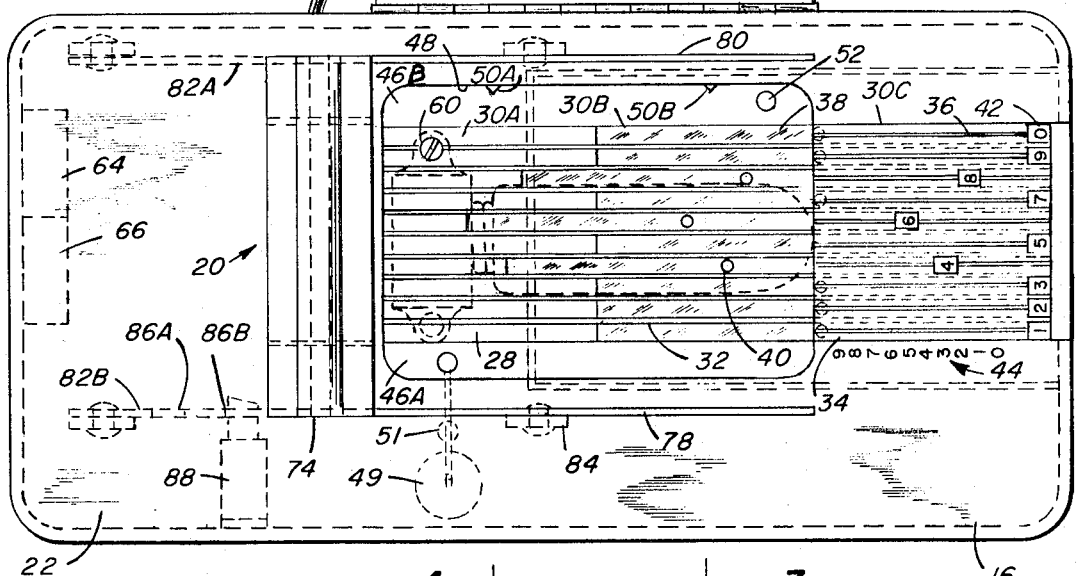
FIG. 6
FIG. 2
FIG. 1
INVENTOR.
NOEL W. TAULMAN
BY
Head & Johnson
ATTORNEYS INVENTOR.
NOEL W. TAULMAN
BY
Head & Johnson
ATTORNEYS

1

THEFTPROOF CREDIT CARD APPARATUS

BACKGROUND OF THE INVENTION

This invention relates to an apparatus used in a recordation of credit sales which is employed in conjunction with a credit card and more particularly to an apparatus wherein a housing member has a first set of apertures which are selectively alignable with a second set of apertures on a card whereby light passing therethrough impinges on a photosensor thereby unlocking a roller mechanism.

Credit cards are commonly known and are usually comprised of small portions of sheet material from a place of business denoting thereon a single individual who has earned the privilege of charging goods and services, the payment of services and goods to be received by the business at a later time. Such credit cards are commonly used by society and one individual may have six, eight, ten or more cards for which goods and services may be purchased on credit. If one of these cards happens to be lost by the owner and falls into the hands of an unauthorized person, this person can, in a short time by forging the individual's name when making purchases, charge a large amount of goods and services to the owner's account. Although such unauthorized use is against the law, each year credit card holders and the businesses issuing the cards lose a great deal of money from such unauthorized use.

It is an object of this invention to provide an apparatus for the recordation of credit sales which can be made operable only by the individual to whom the card is issued, and in which the correct or incorrect operation can be easily detected by a merchant making the sale.

SUMMARY OF THE INVENTION

Generally this invention utilizes a housing member having thereon a set of slidable apertures and a slidable roller member, retained at the merchant's place of business and a card which is carried by the individual customers, the card having a plurality of apertures therethrough and embossed information thereon. In addition to the card with the apertures therethrough, the customer also carries a sheet segment having coded information thereon. In the recordation of a credit sale, the credit card is placed on the housing member and the merchant, using the coded information given to him by the customer, selectively aligns the set of apertures on the housing member with the apertures on the card whereby light from within the housing member passes through the registered aligned sets of apertures and impinges upon the photosensor of a light meter which has been placed over the card whereby the roller member is unlocked and after the light meter has been removed from over the card the roller member can be passed over the card thereby imprinting the embossed information on the card onto a credit ticket.

BRIEF DESCRIPTION OF THE DRAWINGS

FIG. 1 is a side view of the housing member which is an element of this invention.

FIG. 2 is a plan view of the housing member.

FIG. 6 is a view of the credit card showing a detachable coded segment which is an element of this invention.

DETAILED DESCRIPTION OF THE PREFERRED EMBODIMENT

Figure 3:
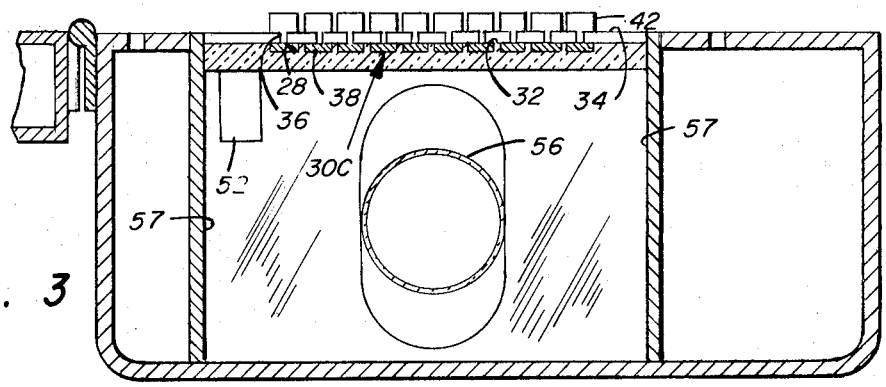
FIG. 3 is a cross-sectional view of a housing member taken along the lines 3-3 of FIG. 2.

In describing the preferred embodiment of this invention specific terminology will be resorted to for the sake of clarity. However, it is to be understood that each specific term used includes all mechanical equivalents which operate in a similar manner to accomplish a similar purpose.

Referring now to FIGS. 1 and 2, the apparatus denoted generally as numeral 10, has a main housing member 16, a head member 18 pivotally attached to the main housing 16, and a roller member 20 slidably mounted on the main housing 16. Used in conjunction with the apparatus and shown in FIG. 6 is a card 12 having a plurality of apertures therein and embossed information thereon and having a detachable segment 14 which carries coded information. The design of credit card 12 does not preclude it from being utilized in conventional credit card recording machines. When the credit card 12 is sent to the customer, it is recommended that the credit card 12 and the tab 14 be mailed separately to further reduce the chances of both being stolen from the mails.

The main housing member 16 is a rectangular enclosure having a horizontal top surface 22 and a bottom surface 24. Longitudinally recessed in the top surface 22 of the main housing member 16 in abreast relationship are a plurality of elongated, flat-bottomed raceways 28 separated by raised lip surfaces 32 and having a rearward portion 30A, an intermediate portion 30B and a forward portion 30C. The intermediate portion 30B, being fabricated from translucent material, forms a window in the top surface 22 of housing member 16 whereby light from within the housing member 16 can emanate outwardly therethrough. The raised lip surfaces 32 of the intermediate portion 30B are painted black in color in order to clock any light passage.

As seen in FIG. 3, resting on the lip surfaces 32 of the forward raceway portion 30C and laterally and longitudinally covering thereover is a plate 34 having a plurality of elongated slots 36, each slot being directly above the longitudinal centerline of an individual raceway 28. Slidably disposed within each of the raceways 28 is an elongated flat metal band 38 of a length slightly longer than the aggregate length of the intermediate raceway portion 30B and the forward raceway portion 30C. Looking now at FIG. 2 each metal band has a single aperture 40 therethrough. Rigidly affixed to each of the metal bands 38 and projecting upwardly therefrom through the elongated slot 36 is a T-shaped tab 42 by means of which each of the metal bands can be selectively moved forwardly and rearwardly within the raceway 28 thereby causing its aperture 40 to assume various positions over the intermediate translucent raceway portion 30B. Along the side of the raceway 28 there is a set of indicia 44 for ascertainment of the relative position of the apertures 40 over the translucent intermediate raceway portion 30B.

Looking at FIG. 2, intermediate the respective longitudinal edges of the raceway portions 30A and 30B and the top surface 22 of the main housing member 16 in the same horizontal plane as the top of said raised lips 32 are two planar surfaces 46A and 46B acting in conjunction to form a card receptacle 48. Cantileverly extending from the top surface 22 over planar surface 46A are two tandem spaced retainer extensions 50A and 50B. Disposed within the main housing member 16 is a card position switch 52 having a momentary normally open contact, said switch having an upwardly-downwardly moving contact actuator lever vertically protruding through the planar surface 46A.

Figure 4:
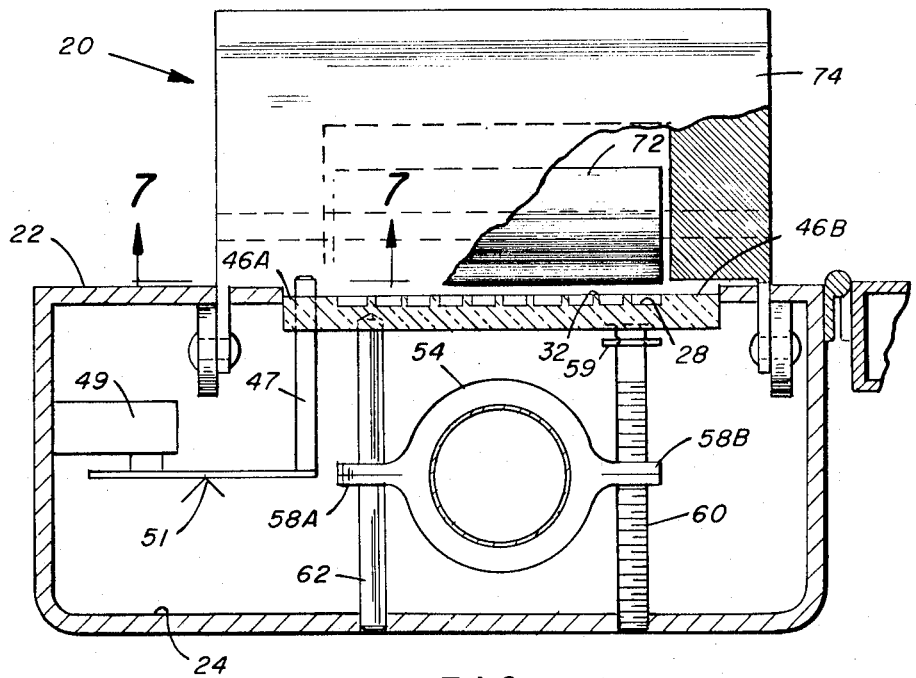
FIG. 4 is a cross-sectional view of the housing member taken along the lines 4-4 of FIG. 2.

Referring now to FIG. 4, adjacent the rearward end of planar surface 46A and bored therethrough is an aperture through which a roller stop pin 47 can vertically pass and protrude above the top surface 22. Vertical movement is imparted to the roller stop pin 47 by means of a spring biased roller stop electrically operated solenoid plunger 49 communicating with the roller stop pin via a seesaw 51, the roller pin 47 and plunger 49 being respectively hinged to the opposite ends of the seesaw. The plunger 49 is spring biased, that is, the plunger is extracted when the solenoid is deenergized and retracted when the solenoid is energized.

Disposed in the main housing member 16 within an outline formed by the downward extension of raceway 28 is an electrical light socket 54 carrying a light bulb 56 longitudinally extending therefrom so as to be directly under the translucent intermediate raceway portion 30B. The bulb 56 may be either the standard incandescent or fluorescent type and is enclosed by walls 57. As can be seen in FIG. 4, the electrical light socket 54 has diametrically opposed ear segments 58A and 58B horizontally and laterally projecting outward therefrom; each ear segment has an internal aperture vertically passing therethrough, the aperture on ear 58B having female screw threads. Vertical adjustment of the light socket 54 is accomplished by a threaded adjusting screw 60 passing through the female threads in the aperture of ear 58B; the head of the adjusting screw is rotatably received in a counterbore hole within the rearward raceway portion 30A, and a snap washer 59 is received in a groove on the screw thereby restraining the screw 60 from vertical movement. Passing through the aperture in ear 58A is a vertical guide pin 62, the outer circumference of which is smooth so that when the adjusting screw 60 is rotated, vertical movement will be imparted to the socket 54 while the guide pin 62 restrains the socket from horizontal pivotal movement about the adjusting screw 60.

Figure 7:
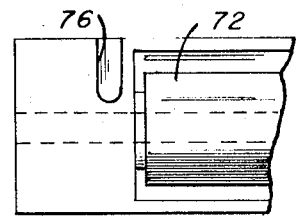
FIG. 7 is a cross-sectional view of the roller member taken along lines 7-7 of FIG. 4.

Looking now at the roller head member 20 in FIGS. 1 and 2, above the upper surface of the main housing 16 and extending part way across thereof is a handle 74 having rotatably received therein as an integral part thereof and along the longitudinal axis thereof a cylindrical roller drum 72 in such a manner that the lower end of said cylindrical roller drum 72 is contiguous with the upper surface 22 of the main housing member 16. As shown in FIG. 7, lateral to the cylindrical roller drum 72 and perpendicular to the axis thereof at the bottom of the handle 74 is an elongated aperture 76, the longitudinal centerline of the aperture being in alignment with said roller stop pin 47.

Rigidly attached to each of the respective ends of the handle 74 and vertically downwardly extending beneath the upper surface of the housing member 16 through a first elongated longitudinal slot 78 and second elongated longitudinal slot 80 therein are inverted T-shaped guide means 82A and 82B having a vertical portion and a horizontal portion. At the outer extremities of each of the horizontal portions of the T-shaped guide means 82A and 82B is disposed a wheel 84 rotatable about an axis perpendicular to the horizontal portion and contiguous with the underside of the top surface 22 of the main housing member 16 whereby said handle can be given longitudinal movement along raceway 28. Two rectangular tandem spaced keepers 86A and 86B are located on the horizontal portion of the guide means 82B intermediate the rearward wheel 84 and the vertical portion thereof. A spring biased electrically operated solenoid plunger 88 is rigidly attached to the perpendicular sidewalls of main housing member 16 in such a manner that plunger 88 is engageable in one of the respective keepers 86A and 86B when the roller member 20 is in a predetermined selected position.

Conveniently mounted within the main housing member 16 is a first relay 64 having normally opened contacts 65 and a second relay 66 having normally opened contacts 67.

The head member 18, as shown in FIGS. 1 and 2, pivotal about an upper longitudinal edge of main housing 16 so that it can be positioned over the intermediate raceway portion 30B, is an enclosed hollow rectangular box having a top upper surface through which vertically passes a momentary pushbutton 90. Pushbutton 90 has an upper flat end and a lower end which has a first contact surface 91A and a second contact surface 91B, the second contact surface being in a lower horizontal plane in relation to the first contact surface when the head assembly 18 is positioned over the translucent raceway portion 30B. Within head member 18 is a light energizing switch 92 of the type commonly used in the industry having a momentary normally open contact and a vertically pivotal contact-actuating lever 94 one of the ends of which is disposed in an outline form by the downward extension of the first contact surface 91A of pushbutton 90. Within an outline created by the extension of the second contact portion 91B of the pushbutton 90 is a roller keeper plunger energizing switch 102 having a momentary normally open contact, the actuating button of switch 102 being in facing relationship with the second contact portion 91B of pushbutton 90. In addition to the light energizing and roller keeper plunger energizing switches there is also located within the head member 18 a light meter 96, having a photosensor 98 recessed in a rectangular aperture on the surface of the subhousing 18 which faces the raceway 28 when head member 18 is pivoted onto the main housing 16, the photosensor portion being directly over the intermediate translucent raceway portion 30B, and a pointer 100 horizontally pivotal and so positioned within head member 18 that at a predetermined footcandle value of light it is intermediate the second contact portion 91B of pushbutton 90 and roller retainer plunger energizing switch 102 whereby the normally opened contacts of switch 102 can be closed by downward movement of pushbutton 90. The subhousing 18 also contains a circuit energizing switch 104 having a contact which closes when the head member 18 is positioned over raceway 28, the contact of switch 104 becoming opened after a preset time period after the head member 18 has been removed from the position over the raceway. A bore aperture 99 passes transversely through the subhousing member and is in alignment with the adjusting screw 60 when the subhousing 18 is positioned over the raceway 28.

Figure 5:
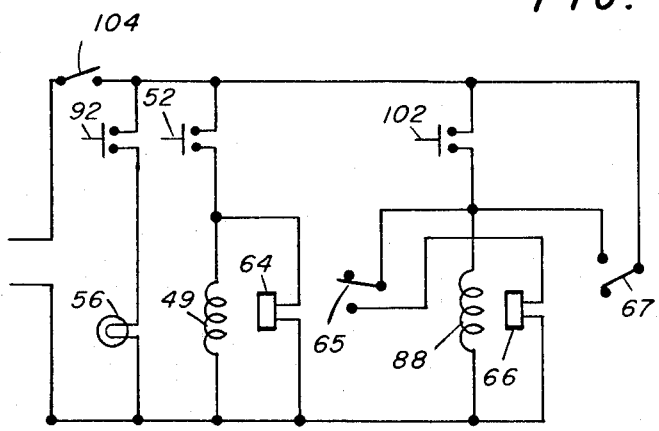
FIG. 5 is an electrical schematic of the wiring within the housing member.

Referring to FIG. 5 the apparatus 10 is wired as shown in the schematic. The wires between the main housing member 16 and the subhousing 18 are enclosed in a flexible cableway 106. The circuitry is connected to an energy source which may be of any specific voltage but which will commonly be of 110-volt value which is easily obtained in gas stations and other places of business. The circuitry comprises the circuit energizing switch 104, in series with the parallel combination of: the series combination of the light energizing switch 92 and light bulb 56; the series combination of the card position switch 52 and the parallel arrangement of the coil of first relay 64 and the coil of the roller stop pin plunger 49; the parallel combination of roller retainer plunger energizing switch 102 and normally open contact 67 of relay 66 in series with the parallel combination of the coil of the roller keeper plunger 88 and the coil of second relay 66 in series with said normally open contact 65 of relay 64.

OPERATION OF THE DEVICE

In operation, the customer gives the merchant his credit card 12 with the apertures thereon. The merchant then places the card in the card receptacle 48 on the apparatus 10 whereupon the electrical contacts of the card position switch 52 are closed thereby energizing roller stop pin solenoid operated plunger 49 whereby the seesaw 51 retracts the roller stop pin 47, and energizing first relay 64 thereby closing contact 65. Next the merchant pivots the head member 18 over the main housing member 16 whereupon the photosensor 98 becomes positioned directly over the translucent intermediate raceway portion 30B and the contacts of circuit energizing switch 104 close.

Customer then communicates the coded information from tab 14 to the merchant who selectively moves the tabs 42 thereby positioning the apertures 40 on the metal bands 38 in registered alignment with the apertures on the card 12. The segment 14 stays in the customer's possession at all times thus assuring that the coded information is not unintentionally left with the merchant along with the card. The merchant then depresses the pushbutton 90 downwardly whereby the actuating lever 94 energizes the contacts of light energizing switch 92 thereby energizing light 56, whereupon light emanates through the registered apertures 40 and the apertures in the card 12 and impinges upon the photosensor 98. If the amount of light received on the photosensor 98 is of a correct predetermined foot-candle value, the pointer 100 of the light meter 96 will horizontally pivot until the pointer 100 is intermediate the second contact portion 91B of the pushbutton 90 and the roller keeper plunger energizing switch 102. Further downward movement of the pushbutton 90 closes the contact on switch 102 which energizes the coil of the roller keeper plunger 88 thereby retracting it from keeper 86B and releasing the roller member 20 for longitudinal forward movement. The closing of the contacts on the roller keeper plunger energizing switch 102 also energizes the coil of the second relay 66 which closes normally opened contacts 67 thereby forming a circuit path around switch 102.

At this point head member 18 is pivoted from the position over the main housing 16 and a credit ticket is placed over the card 12 whereupon the merchant slidably glides the roller member 20 forwardly over the ticket and the card 12 whereby the embossed information on the credit card, that is, the customer's name, address and consumer number, is imprinted upon the credit ticket. The merchant then glides the roller member 20 rearwardly away from the credit ticket and card 12 and removes the credit ticket and the card. The removal of the card 12 from the receptacle 48 deactivates the card position switch 52 which deenergizes the coil of roller keeper plunger 88 causing the plunger, due to the spring biasing, to again lodge into the keeper 66B thereby restraining the roller member 20 from longitudinal movement until the preceding procedure has again been performed.

If one attempts to remove the card from the receptacle 48 after the head member 18 has been pivoted from the main housing member 16 and after the roller head member 20 has been moved forwardly part way but not completely over the card 12, the card position switch 52 will become deenergized, that is, its contacts will open and the roller stop pin plunger 49 will extend downwardly thereby causing the roller stop pin 47 to extend upwardly to become lodged in the elongated aperture 76 on the roller member 20 thus preventing any further forward movement of roller member 20. In addition, the deenergization of the card position switch 52 also removes electricity from the coil of roller keeper plunger 88 which causes plunger 88 to become engaged into keeper 86A which also prevents further movement of the roller member 20. Hence, a card cannot be removed from the receptacle 48 and a different card inserted any time during operation of the apparatus.

When the illumination output of the light bulb 56 decreases, the merchant can adjust the light by placing a standard card in the card receptacle 48 of the apparatus and putting the light sensor over the card. The merchant then passes a screwdriver through the borehole 99 in the head member 18 and engages the screwdriver in the head of the adjusting screw 60. He then rotates the screw 60 causing upward movement of the light socket and the light bulb 56 until the pointer 100 on the light meter 96 assumes the correct position intermediate the pushbutton 90 and roller keeper energizing switch 102. Thus the light bulb 56 can be used during its entire productive life span.

I claim:

1. An apparatus for the recordation of credit sales of merchandise onto a credit ticket from a credit card, the credit card having a plurality of apertures therein and having information embossed thereon, comprising:
   a housing member having a receptacle for receiving an apertured credit card and a credit ticket thereon;
   a light source located within said housing member below said receptacle;
   a plurality of slidable members, each including an aperture, supported by said housing structure intermediate said light source and said receptacle, the aperture in each of said slidable members being alignable with an aperture in an apertured credit card positioned in said housing receptacle, said slidable members being individually slidably positionable relative to a register;
   a head member positionable over said receptacle in said housing, said head member mounting a plurality of photosensitive means responsive to light passing through aligned apertures in a credit card and said slidable members;
   circuitry for producing a signal responsive to excitation of said photosensitive means;
   a roller member mounted on said housing;
   means normally locking said roller member in a rest position; and
   means responsive to said signal produced by said circuitry for unlocking said roller member when said slidable members are properly positioned to align the apertures therein with the apertures in a credit card.

2. An apparatus for the recordation of credit sales of merchandise onto a credit ticket as in claim 1 wherein said head member comprises:
   a hollow subhousing structure pivotally mounted to said housing structure and having an upper and lower surface;
   a pushbutton mounted on and extending through said upper surface of said subhousing, said pushbutton having a first and second operable position;
   a roller retainer plunger energizing switch within said subhousing having contacts disposed within an outline formed by the extension of said pushbutton and electrically communicating with said roller retainer plunger;
   said photosensitive means being within said subhousing and having an indicator pivotally responsive to the foot-candle value of light received from said light source, through said aligned apertures, said indicator at a predetermined foot-candle value of light being intermediate said pushbutton and said roller retainer plunger energizing switch whereby said pushbutton in said second operable position closes said contacts on said roller retainer plunger energizing switch; and
   a circuit energizing switch having contacts which are closed when said head member is positioned over said receptacle and which remain closed for a preset time period after said head member has been removed from said position over said receptacle.

3. An apparatus for the recordation of credit sales of merchandise as in claim 2 wherein said pushbutton has a first and second contact surface and wherein said light source is energized by a light energizing switch disposed within said housing and having contacts which communicate with said first contact surface of said pushbutton by means of an actuating lever whereby said contacts close when said pushbutton is positioned intermediate said first and second operable positions.

4. An apparatus as in claim 2 wherein said card receptacle has two apertures and includes:
   a card position switch having a vertically operating contact actuator protruding vertically through one of said apertures in said card receptacle, the contacts of said card position switch being closed when said card is inserted in said receptacle;
   a roller stop pin vertically protrudable through the other aperture in said card receptacle and having one end connected to an end of a seesaw means;
   a spring-biased electrically operated solenoid roller stop pin plunger connected to the other end of said seesaw and electrically communicating with said card position switch, said roller stop pin plunger being extracted when the contacts of said card position switch are open whereby pivotal movement of said seesaw causes said roller stop pin to protrude through said aperture in said card receptacle thereby preventing movement of said roller member over said credit card; said roller stop pin plunger being retracted by closure of the contacts of said card position switch when said card is inserted in said card receptacle whereby said seesaw is given pivotal movement whereupon said roller stop pin is withdrawn from the aperture in said card receptacle and said roller member can be glided over said credit card.